United States Patent [19]

Iijima et al.

[11] 4,184,857
[45] Jan. 22, 1980

[54] STRIPPING COLUMN AND PROCESS FOR REMOVAL OF VOLATILE MATTER

[75] Inventors: Takashi Iijima, Yokohama; Taizan Suzuki, Fujisawa; Yusuke Murayama, Yokohama; Eitaro Nakamura; Shinji Ueno, both of Kurashiki, all of Japan

[73] Assignees: JGC Corporation; Nippon Zeon Co., Ltd., both of Tokyo, Japan

[21] Appl. No.: 871,581

[22] Filed: Jan. 23, 1978

Related U.S. Application Data

[63] Continuation-in-part of Ser. No. 782,878, Mar. 30, 1977, abandoned.

[30] Foreign Application Priority Data

Apr. 5, 1976 [JP] Japan .................. 51-37215

[51] Int. Cl.² .................. B01D 19/00; B01D 3/14
[52] U.S. Cl. .................. 55/54; 55/186; 261/114 JP

[58] Field of Search .............. 55/53, 54, 186, 55, 55/193; 261/92, 100, 103, 106, 112, 113, 114 R, 114 JP; 138/39

[56] References Cited

U.S. PATENT DOCUMENTS

| 1,378,716 | 5/1921 | Nielsen et al. | 261/114 R |
| 1,770,725 | 7/1930 | Bartels | 261/114 R |
| 2,500,934 | 3/1950 | Dean | 261/114 R |
| 2,590,797 | 3/1952 | Siciliano | 138/39 |
| 3,151,046 | 9/1964 | Larson | 261/114 R X |
| 3,550,916 | 12/1970 | Hoppe et al. | 261/114 JP |
| 3,717,553 | 2/1973 | Otsuki et al. | 261/114 JP X |
| 4,007,022 | 2/1977 | Schleicher et al. | 55/55 X |

Primary Examiner—Robert H. Spitzer
Attorney, Agent, or Firm—Frank J. Jordan

[57] ABSTRACT

A stripping column for removing volatile matter from a slurry containing sedimentary solid matter and the volatile matter, comprising a plurality of trays each consisting of a plurality of tray segments, a baffle plate and a downcomer, each of the tray segments being so formed as to have many inclined slits and inclined flat planes. In one embodiment, this invention relates to a process for such removal using the stripping column.

17 Claims, 6 Drawing Figures

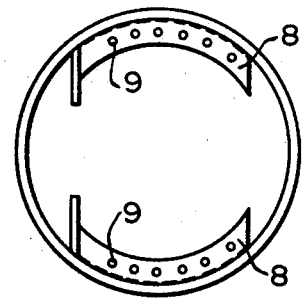
FIG. 4
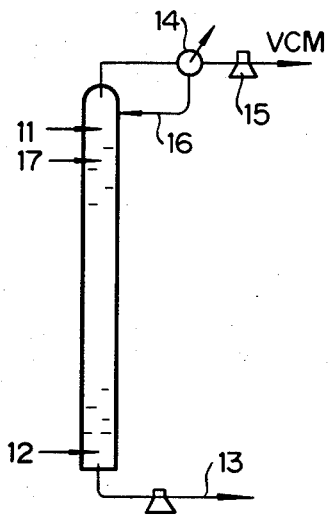
FIG. 5
FIG. 6
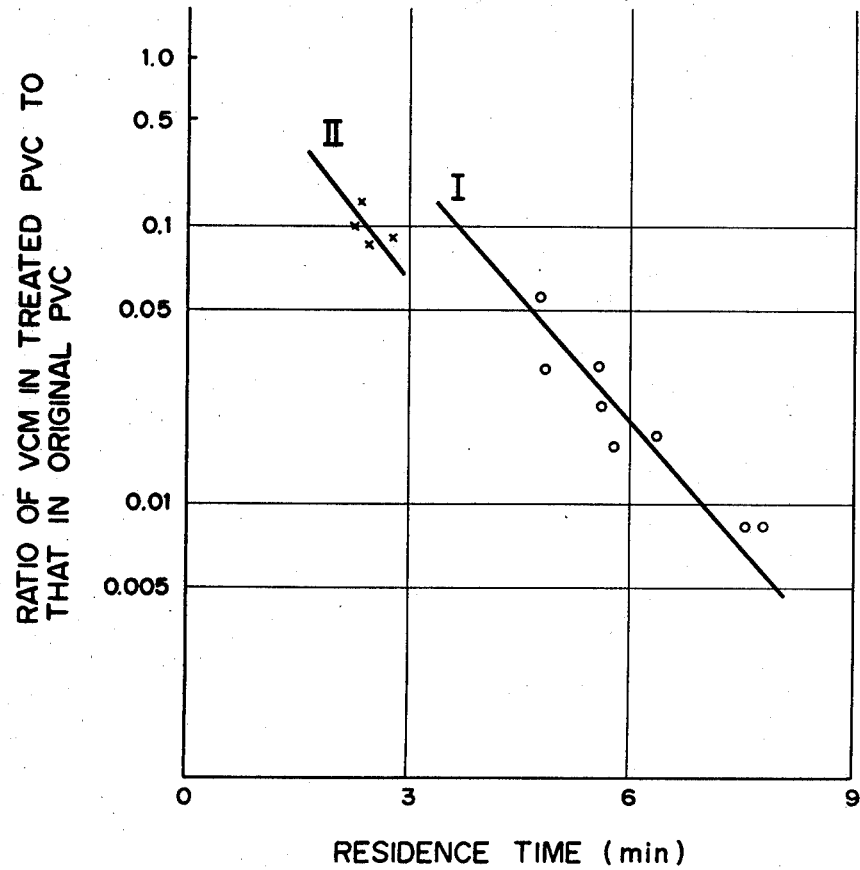

4,184,857

STRIPPING COLUMN AND PROCESS FOR REMOVAL OF VOLATILE MATTER

This is a continuation-in-part application of Ser. No. 782,878 filed Mar. 30, 1977, now abandoned.

BACKGROUND OF THE INVENTION

1. Field of the Invention

This invention relates to a stripping column for removing volatile matter from a slurry containing sedimentary solid matter and the volatile matter.

2. Description of the Prior Art

It is known that trays for contacting gases with liquids which have conventionally been used in gas-liquid contact columns, include bubble cap trays, sieve trays, valve trays and kittel trays as described in the U.S. Pat. No. 3,338,566. When a slurry containing a considerable amount of solid matter is contacted with a gas in a column provided therein with the conventional trays, the solid matter will tend to settle or precipitate on the trays and other sites within the column, because these conventional trays have horizontally flat planes.

U.S. Pat. No. 3,550,916 discloses trays which have no flat planes and enable a liquid on the tray to flow zigzag thereon and maintain the velocity of the liquid at a relatively high level on each of the tray segments composing the tray. The Patent further discloses that the trays are suited to contact a liquid or fluidized bed particulate solid with a gas or vapor, but it does not particularly refer to an apparatus for stipping a slurry of volatile matter contained in the sedimentary particulate solid in the slurry. It is considered that the object of the invention of the Patent is to provide a general-purpose apparatus having a structure suitable for heat transfer or mass transfer.

DETAILED EXPLANATION OF THE INVENTION

It is a primary object of this invention to provide a stripping column for the removal of volatile matter from a slurry containing sedimentary solid matter and the volatile matter, comprising a plurality of trays each consisting of a plurality of tray segments, a baffle plate and a downcomer, each of the tray segments being so formed as to have many inclined slits and inclined planes.

Another object of this invention is to provide a process for such removal using said stripping column.

These and other objects, as will hereinafter become more readily apparent, can be attained by the provision of a column for stripping a slurry containing sedimentary solid matter and volatile matter of the volatile matter, the column being fitted therein with self-cleanable trays of a specified structure to render it possible to effect a very efficient and economical gas-slurry contact with a less pressure drop thereby to remove the volatile matter from the slurry without settlement and deposition of the sedimentary solid matter.

The inclined slits serve to provide a gas blown off upward through the inclined slits with an acute directionality with respect to the tray segments thereby to disperse at least a part of the slurry flowing on the tray and form a gas-solid-liquid mixed phase on and above the tray.

The tray segments of each tray are arranged so that the opening direction (as indicated by the symbol "Z" in FIG. 1) of the slits of each tray segment is different from, or crosses obliquely, the direction (as indicated "Y" in FIG. 2) of main stream of the slurry on the tray and so that the opening direction of the slits of one tray segment is different from, or crosses obliquely, that of the slits of another tray segment adjacent to the former, thereby accelerating the flowing velocity of the slurry on and above the tray and giving a zigzag flow to the gas-solid-liquid mixed phase on and above the tray during the operation.

A baffle plate is installed above the down-stream end of the tray with a clearance between said end of the tray and the lower end of the baffle plate.

The column of this invention may preferably be used particularly for stripping a slurry of a polymer such as polyvinyl chloride (hereinafter referred to as "PVC"), polystyrene or polymethyl methacrylate, of volatile matter such as unreacted monomer contained in the liquid and polymer particles composing the slurry, without settlement of the polymer particles in cases where the polymer is one prepared by suspension polymerizing vinyl chloride, styrene, methyl methacrylate or a derivative thereof alone or with another monomer copolymerizable therewith in an aqueous medium.

In order to see whether or not the trays disclosed by U.S. Pat. No. 3,550,916 are suitable for removing volatile matter from a slurry containing the volatile matter, the present inventors made experiments by contacting an aqueous slurry containing PVC particles from about 30 to about 300$\mu$ in particle size and 8000–10,000 ppm of the unreacted monomer countercurrently with steam in a stripping column fitted therein with the trays as disclosed by said U.S. Patent, with the result that the PVC particles did not deposit on the trays while the volatile matter contained in the PVC particles was not fully removed. In the column, each of these trays consists of a plurality of tray segments having slits, the tray segments being arranged so that the opening direction (as indicated by the symbol "Z" in FIG. 1) of the slits of each tray segment is different from, or crosses obliquely, the direction (as indicated "Y" in FIG. 2) of main stream of the slurry on the tray and so that the opening direction of the slits of one tray segment is different from, or crosses obliquely, that of the slits of another tray segment adjacent to the former. The flow of a slurry on the tray is accelerated and given a zigzag motion by the force of a gas blown upward through the slits whereby the residence time of the slurry on the tray is comparatively lengthened although the flow of the slurry on each of the tray segments is at a comparatively high velocity thereby preventing solid particles to deposit on the tray. However, it has been found that said known process alone is not so effective in stripping a slurry (such as a PVC slurry containing the unreacted vinyl chloride monomer as the volatile matter) of volatile matter contained in the liquid portion and particulate solid portion of the slurry. To remove from the slurry volatile matter contained not only in the liquid portion of the slurry but also in the particulate polymer portion thereof, a further longer residence time for contact of the slurry with the gas is required, unlike stripping of the volatile matter contained only in the liquid portion of the slurry.

Thus, in order to allow the slurry to contact with the gas for a sufficiently long time while preventing the particulate solid matter from depositing, a distance over which the slurry flows is required to be longer or the number of trays used is required to be increased; these, however, will incur enlargement or scaling-up of a stripping column to be used, thus involving economical disadvantages.

The present inventors have achieved these objects by using trays as disclosed by U.S. Pat. No. 3,550,916 and a specific baffle plate installed just above the farthest down-stream end of the tray. The baffle plate which is installed at the same position as weirs usually installed in distilling or stripping apparatuses. However, the baffle plate herein referred to is functionally different in the following respects.

The weir serves to hold a liquid to a predetermined depth on the tray while allowing a rising gas to pass in bubble form upward through the thus-held liquid and permitting an excess liquid to overflow over the weir, but it cannot be used for stripping a slurry containing sedimentary solid matter and volatile matter of the volatile matter since the solid matter tends to deposit on the tray in the neighborhood of the weir; on the other hand, in the apparatus of this invention, a specific baffle plate is provided at the same position as the conventional weir is provided, thereby solving the aforesaid problems. The baffle plate is fitted so that it is positioned above the tray with a clearance of for example 2 to 10 mm, as determined depending upon the flow of the slurry on the tray, between the down-stream end of the tray and the lower end of the baffle plate, thereby to guide the sedimentary matter which would otherwise deposit, through the clearance to a downcomer and ensure a sufficient residence time of a gas-solid-liquid mixed phase on the tray by inhibiting the mixed phase from flowing freely through the downcomer to the next lower tray.

It is thus desirable that the baffle plate be supported at its ends by the inner wall of the column with a minimum necessary support by the tray. It is desirable from the view-point of mechanical strength and economy that the baffle plate be made of a solid material such as a steel plate.

As one of the features of this invention, several stream breakers are installed on the tray so that they face against the main stream of the slurry. The slurry flowing on the tray, together with the gas blown upward through the slits of the tray, is partly passed through the slits of the stream breakers to impinge against the reverse side of the next upper tray thereby to keep the reverse side clean by preventing the solid matter contained in the impinging slurry from attaching to the reverse side. This self-cleaning action is effective in preventing the slits of the next upper tray from being clogged with the solid matter from the impinging slurry.

It is desirable that the portion (deck plate) of the tray plate just below the downcomer be inclined and the support ring for the tray be perforated to prevent the solid matter of the slurry from precipitating and depositing on the tray.

In addition, the process using the aforesaid apparatus according to this invention is suitable for stripping a slurry containing volatile matter of the volatile matter, particularly for stripping a PVC slurry containing VCM (vinyl chloride monomer) of the VCM.

This invention will be further explained by the following Example with reference to the accompanying drawings.

EXAMPLE

FIG. 4 is a plan view of a perforated support ring fitted in a stripping column embodying this invention;

FIG. 5 is a schematic view illustrating the operation of a stripping column provided therein with multi-stage specified trays according to this invention; and FIG. 6 illustrates the relation of the stripping effect to the residence time of a slurry between a stripping column with a baffle plate and one without such a baffle plate.

Figure 1:
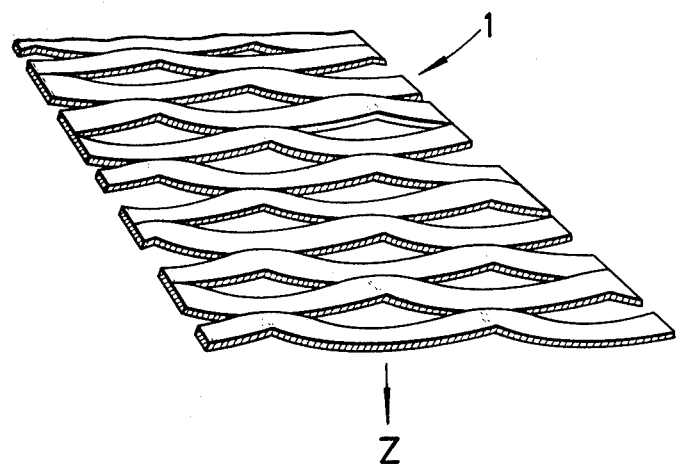
FIG. 1 is a partial perspective view of an embodiment of a tray segment having inclined or slant slits and inclined planes.
Figure 2:
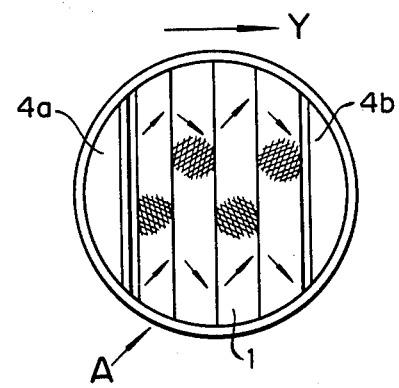
FIG. 2 illustrates a tray used in a column of this invention, comprising the tray segments of FIG. 1 arranged so that a gas may be blown off through the slits in the directions of small arrows.
Figure 3:
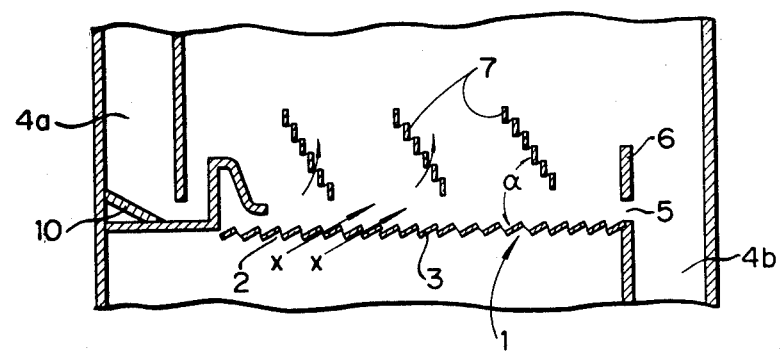
FIG. 3 illustrates a schematic cross-sectional view of a baffle plate, stream breakers and deck plate installed on a tray.

Referring now to FIGS. 1, 2 and 3, numeral 1 shows a specified tray segment which is a so-called Expand Metal, numeral 2 the inclined slits of the tray segment 1 and numeral 3 the inclined planes thereof. Symbol "A" indicates a tray composed of a plurality of tray segments 1. The width of the slits of the tray segment 1 is preferably about 2–5 mm for example. As shown in FIG. 2, the tray segments are arranged in a stripping column so that a stripping gas blown off through the inclined slits 2 is directed in a direction X at an angle of about 45° for example, with a direction in which a slurry flows and, in addition, one tray segment 1 and the adjacent tray segment 1 are arranged in such a relation that the direction of the stripping gas blown off through the slits of the former segment makes an angle of about 90° for example with that of the gas blown off through the slits of the latter segment. A part of the slurry on the tray is dispersed by the gas into minute particles consisting of the solid matter and/or the liquid, to form a gas-solid-liquid mixed phase, thereby to effect an efficient gas-slurry contact.

As is apparent from FIGS. 1, 2 and 3, the zigzag flow is caused not only by arranging the tray segments so that the opening direction Z of the slits 2 of the tray segment 1 makes an acute angle with the flow direction Y of the main or general stream of the slurry but also by arranging the tray segments so that the opening direction (as indicated by the symbol "Z" in FIG. 1) of the slits of each tray segment is different from, or crosses obliquely, the direction (as indicated "Y" in FIG. 2) of main stream of the slurry on the tray and so that the opening direction of the slits of one tray segment is different from, or crosses obliquely, that of the slits of another tray segment adjacent to the former. Referring to FIG. 2, the gas-solid-liquid mixed phase has an acute-angle flow directionality with respect to the tray segment 1.

As is apparent from the above, the slurry on each of the tray segments is made to flow at a high velocity thereby causing no sedimentation of the solid matter from the slurry on the tray segment, while the slurry flows zigzag on the tray A thereby lengthening the residence time of the slurry on the tray. According to this invention, to lengthen the residence time, a baffle plate 6 is provided above the down-stream end of the tray so that a suitable clearance 5 is obtained between the lower end of the baffle plate 6 and the down-stream end of the tray A as indicated in FIG. 3. The baffle plate 6 serves to inhibit a liquid-solid-gas mixed phase from falling freely toward the downcomer 4b thereby keeping the mixed phase in a considerable thickness on the tray and also to permit the sedimentary solid matter of the slurry from the tray to pass through the clearance 5 toward the downcomer 4b. The presence of the clearance 5 is very effective in preventing the sedimentary solid matter from depositing on the tray; if in the column, the baffle plate according to this invention were substituted by a usual weir of a distillation column, the weir being closely attached at the lower end to the down-stream end of the tray only to retain the slurry to a certain level, then a large amount of the solid matter would deposit initially at the corner portion of the tray near the lower end of the weir and then at the portion extending from the corner portion to the up-stream portion of the tray, thereby to render the operation of the apparatus impossible in a short time.

Stream breakers are indicated at 7 in FIG. 3. During the development of a stripper for a PVC slurry with VCM contained therein, conventional stream breakers were installed on a tray in the stripper so that they face against the main stream of the slurry to direct the flow of the slurry on the tray downward as greatly as possible. However, the aforesaid conventional procedure (installation of the stream breakers) was found to be somewhat unsatisfactory in stripping the slurry of volatile matter contained therein. When practicing this procedure, the flow of the slurry on the tray was accelerated but a part of mist generated by contact of the slurry with the gas reached the reverse side of the next upper tray at which reverse side the slurry was separated into the solid matter and the liquid whereby the solid matter tended to deposit gradually at said reverse side. The amount of the solid matter deposited increased with the lapse of time, and the slits of the next upper tray were found to be gradually clogged with the solid matter by the increasing deposition of the solid matter on the reverse side of said next upper tray. This trouble was not such that it gave a crucial damage to the apparatus, but the present inventors found that better results were obtained by the use of stream breakers installed in the following manner.

The stream breakers 7 according to this invention, which were identical with Expand Metal in this case, were installed so that the gas-solid-liquid mixed phase was partly passed through the slits of the breakers to be further directed upward, preferably perpendicularly, to the reverse side of the next upper tray. The angle α (as shown in FIG. 3) made between the stream breaker and the tray was preferably in the range of 40°-75°. This enables the slurry on the tray, together with a gas blown upward through the slits 2 of the tray, to impinge obliquely upon the stream breaker whereby a considerable part of the impinging mixed phase collided with the reverse side of the next upper tray. Thus, the reverse side of the next upper tray was always cleaned with the colliding mixed phase thereby to render a long-term operation of the stripping column possible or render the trays self-cleanable.

In addition, the solid matter is apt to precipitate and deposit from the slurry containing the solid matter on both the support ring 8 carrying the tray thereon in the column and the portion of the tray just below the downcomer 4a of the next upper tray. In order to avoid this disadvantage, it is preferable that the support ring 8 is perforated to allow the slurry to pass through the resulting perforations 9 thereby to move the slurry on the support ring as shown in FIG. 4 and the portion of the tray just below the downcomer 4a is formed of an inclined deck plate 10 as shown in FIG. 3.

At the time of suspension of the operation of the column, the PVC slurry goes downward through the slits of the tray segments and the perforations or holes 9 of the support ring 8 without deposition of the solid matter at any parts in the column thereby enabling the inside of the column to be cleaned easily. It should further be noted that the trays used herein are also self-cleanable.

There will now be described a process using the column according to this invention, comprising the steps of: feeding the slurry into the stripping column at the top portion while a stripping gas is introduced into the column at the bottom portion, the column comprising a plurality of trays each consisting of a plurality of tray segments, a baffle plate and a downcomer, each of the tray segments being so formed as to have many inclined slits and inclined planes and the tray segments being arranged so that the opening direction (as indicated by the symbol "Z" in FIG. 1) of the slits of each tray segment is different from, or crosses obliquely, the direction (as indicated "Y" in FIG. 2) of main stream of the slurry on the tray and so that the opening direction of the slits of one tray segment is different from, or crosses obliquely, that of the slits of another tray segment adjacent to the former, thereby giving a zigzag flow to the slurry on and above the tray, and the baffle plate being installed above the down-stream end of the tray with a clearance between the tray segment and the lower end of the baffle plate, thereby passing a part of the slurry and restricting the free falling of the gas-solid-liquid mixed plase from the tray to the downcomer, maintaining the slurry at at least about 40° C. at the top of the column and not higher than at about 110° C. at the bottom thereof, and maintaining the top of the column at a reduced pressure and then recovering the volatile matter from the column at the top and the volatile matter-stripped slurry from the bottom.

FIG. 5 shows a schematic view of stripping embodying this invention when the stripping is effected on an aqueous slurry of PVC containing VCM to be stripped of. Referring to FIG. 5, the slurry is introduced through a line 11 into a stripping column at the top and passed down therein countercurrently with steam supplied through a line 12 into the stripping column at the bottom thereby to recover the VCM vapor together with the used steam from the column at the top while withdrawing the VCM-stripped slurry from the column at the bottom. The steam and VCM vapor are passed through a condenser 14 to condense substantially only the steam therein while discharging the VCM vapor therefrom to the outside of the system by the use of a vacuum pump 15. The condensate, which consisted mainly of steam condensate, is refluxed in a necessary amount to the top of the column via a line 16. The column is provided therein with many trays, for example, 50 trays according to this invention, steam as the stripping gas is fed to the column at the bottom, a PVC slurry is fed to the column at the top, and the steam and slurry contact closely with each other on the trays thereby carrying out an effective VCM stripping.

During the stripping, the bottom of the column is at not higher than about 110° C., preferably 105°-80° C., and the top thereof is at not lower than 40° C., preferably 50°-95° C. with the proviso that the former is always at a higher temperature than the latter. The stripping temperature varies depending on the polymerization degree and other properties of PVC type polymers to be obtained. In a case where the whole condensate at the top is refluxed, additional steam is fed via line 17 to the column near the top thereof to prevent the temperature at the top from being lowered or to increase the stripping effects or efficiencies; it is desirable that the column be kept at 40° C. at the top and at 110° C. at the bottom.

In addition, the top of the column is maintained at a reduced pressure by the use of a vacuum pump 15; it is desirable that the pressure be as low as possible with a pressure of not higher than 635 mmHg being preferred.

The slurry introduced into the column at the top then lowers while contacting with steam, followed by being withdrawn from the column at the bottom through line 13. In this case, the residence time of the slurry in the column may be in the range of 3–20 minutes, preferably 3–10 minutes.

Experiment

In this experiment, there will be explained the operational conditions used in, and the results obtained from, the practice of a process for stripping a PVC slurry containing VCM of the VCM using the stripping column of this invention.

In the column, tray segments each composed of Expand Metals as shown in FIG. 1 are arranged to form a tray so that the slurry may flow zigzag on the tray as shown in FIG. 2. In addition, a baffle plate made of a metal plate is provided above the down-stream end of the tray as indicated in FIG. 3, with a clearance of about 5 mm between the lower end of the baffle plate and the surface of the tray just below the baffle plate. A stream breaker made of Expand Metals is provided just about the boundary of two adjacent tray segments. The stream breakers are positioned so that a gas-solid-liquid mixed phase formed by vigrous contact of the gas blown upward through the slits with the slurry flowing on the tray, is partly directed to the reverse side of the next upper tray through the slits of the stream breaker when the mixed phase impinges upon the stream breaker.

Fifty (50) of the trays each having a 800-mm diameter were fitted snugly in a column having an about 800-mm inner diameter to form a multi-stage (50 trays) stripping column. An aqueous slurry of PVC from an apparatus for the production of PVC, was introduced to the thus-formed stripping column at the top while steam was introduced thereto at the bottom thereby stripping the slurry of the VCM contained therein. The stripping operation was conducted under the following conditions.

PVC (degree of polymerization: 1000)
Content in aqueous slurry: 30 wt.%
VCM content in PVC: 8000–10000 ppm by weight
Amount of steam supplied: 1.0–1.2 ton/hr
Temperature at bottom of column: 90°–95° C.
Temperature at top of column: 60°–65° C.
Pressure at top of column: 450 mmHg
Refluxing: 100% refluxing The stripping results are shown by a graph I in comparison with a graph II in FIG. 6. In this Figure, the axis of ordinate indicates the stripping effects which are expressed as ratios of the VCM content in the PVC contained in the treated slurry withdrawn from the stripping column at the bottom to that in the PVC contained in the original slurry, while the axis of abscissa indicates the residence time between the time at which the slurry is supplied to the column at the top and the time at which the treated slurry is withdrawn from the column at the bottom. In the Figure, the data obtained from the aforesaid experiment using the column of this invention are plotted as "circle" marks (graph I), while the data obtained by following the procedure of the aforesaid experiment except the baffle plate was not provided above the tray for comparison are plotted as "X" marks (graph II).

From FIG. 6 it is seen that the use of the stripping column of this invention enables the residence time of the slurry in the column to be lengthened thereby obtaining high stripping effects as compared with the use of the comparative column without the baffle plates.

Such stripping columns according to this invention may be operated with a high stripping efficiency and without deposition of solid matter at any parts in the column.

What is claimed is:

1. A process for removing volatile matter from a slurry containing sedimentary solid matter and the volatile matter comprising feeding the slurry into a stripping column at the top portion while introducing a stripping gas into the column at the bottom portion, said column comprising a plurality of trays disposed one above another and each comprising a plurality of tray segments and a downcomer, each of the tray segments being so formed as to have a plurality of inclined slits and inclined planes to provide a gas-liquid-solid mixed phase above the tray, said tray segments being so arranged that the direction of the slits vary from segment to segment in turn thereby accelerating the flowing velocity of the slurry on the tray and providing a zigzag flow to the slurry on the tray; the improvement comprising the steps of:

inhibiting the gas-solid-liquid mixed phase on the tray from flowing freely to the downcomer to the next lower tray to thereby ensure a sufficient resident time of said mixed phase on the tray;

simultaneously with said inhibiting step preventing deposit of sedimentary matter on the tray by passing and guiding a part of the slurry to said downcomer;

effecting said step of simultaneously inhibiting said free flow of said mixed phase and preventing depositing of sedimentary matter on the tray by providing a baffle on the downstream side of the tray and providing a clearance between the lower end of the baffle plate and the tray such that the baffle restricts the flow of the said mixed phase while the clearance passes a part of the slurry and the sedimentary matter which would otherwise deposit on the tray; and impinging and directing at least part of said mixed phase to the underside of the next higher tray to thereby clean said next upper tray and render the tray self-cleaning, said impinging and directing step being effected by providing at least one stream breaker above the tray and providing said stream breaker with a plurality of slits through which the mixed phase blows to impinge on the overlying tray to effecting said cleaning.

2. A process according to claim 1 wherein said step of impinging and directing at least a part of the mixed phase to the underside of the next higher tray comprises directing said mixed phase upwardly perpendicular to the reverse side of the next upper tray.

3. A process according to claim 1 further comprising disposing the stream breaker so as to form an acute angle between the stream breaker and the tray in the range of 40°–75°.

4. A process according to claim 1 wherein said stream breaker is made of expanded metal.

5. A process according to claim 1, wherein the slurry is an aqueous slurry compring polyvinlchloride particles and vinylchloride monomer and the stripping gas is steam.

6. A process according to claim 5, wherein all of the condensate withdrawn from the column at the top is refluxed thereto.

7. A process according to claim 1, wherein the stripping gas is fed at the top portion of the column and simultaneously at the bottom portion thereof.

8. A process according to claim 1, wherein the stripping gas is steam.

9. A process for removing vinyl chloride monomer from an aqueous polyvinyl chloride slurry containing the vinyl chloride monomer comprising the steps of:

feeding the slurry into a stripping column at the top portion while introducing a stripping gas into the column at the bottom portion, said column comprising a plurality of trays disposed one above another and each comprising a plurality of tray segments and a downcomer, each of the tray segments being so formed as to have a plurality of inclined slits and inclined planes to provide a gas-liquid-solid mixed phase above the tray, said tray segments being so arranged that the direction of the slits vary from segment to segment in turn thereby accelerating the flowing velocity of the slurry on the tray and providing a zigzag flow to the slurry on the tray;

inhibiting the gas-solid-liquid mixed phase on the tray from flowing freely to the downcomer to the next lower tray to thereby ensure a sufficient resident time of said mixed phase on the tray;

simultaneously with said inhibiting step preventing deposit of sedimentary matter on the tray by passing and guiding a part of the slurry to said downcomer;

effecting said step of simultaneously inhibiting said free flow of said mixed phase and preventing depositing of sedimentary matter on the tray by providing a baffle on the downstream side of the tray and providing a clearance between the lower end of the baffle plate and the tray such that the baffle restricts the flow of the said mixed phase while the clearance passes a part of the slurry and the sedimentary matter which would otherwise deposit on the tray;

impinging and directing at least part of said mixed phase to the underside of the next higher tray to thereby clean said next higher tray and render the tray self-cleaning;

said impinging and directing step being effected by providing stream breakers above the tray and providing said stream breakers with a plurality of slits through which the mixed phase blows to impinge on said next overlying tray to effect said cleaning;

maintaining the slurry at at least 40° C. at the top of the column and not higher than 110° C. at the bottom thereof while the column is kept at a reduced pressure; and then recovering the volatile matter from the column at the top and the volatile matter-stripped slurry therefrom at the bottom.

10. A stripping column for removing volatile matter from a slurry containing sedimentary solid matter and the volatile matter by contacting the slurry with a stripping gas, comprising a plurality of trays each comprising a plurality of tray segments and a downcomer, each of the tray segments being so formed as to have a plurality of inclined planes and inclined slits so that the opening direction (Z) of the slits of each tray segment is different from, or crosses obliquely, the direction (Y) of the main stream of the slurry on the tray and so that the opening direction of the slits of one tray segment is different from, or crosses obliquely, that of the slits of another tray segment adjacent to the former, thereby enabling the slurry on the tray and the gas-solid-liquid mixed phase formed above the tray by the stripping gas blown upward through the slits to flow zigzag, characterized by a baffle plate installed above the downstream end of the tray with a clearance being provided between the tray and the lower end of the baffle plate, thereby to guide the sedimentary solid matter through the clearance to the downcomer without deposition thereof on the tray, said baffle plate also inhibiting the free flow of the gas-solid-liquid mixed phase on the tray to the downcomer to thereby ensure a sufficient residence time of said mixed phase on the tray, and further comprising at least one slitted stream breaker disposed above the tray, said stream breaker having means defining a plurality of upwardly directed slits which open upwardly to pass the gas-solid-liquid mixed phase upwardly to impinge on the reverse side of the next overlying upper tray, thereby cleaning and preventing the slits of the next upper tray from becoming clogged.

11. A stripping column according to claim 10 wherein the stream breaker is disposed to provide an acute angle between the stream breaker and the tray in the range of 40°–75°.

12. A stripping column according to claim 10, wherein the stream breaker is made of expanded metal.

13. A stripping column according to claim 10 wherein said baffle plate is of a solid material.

14. A stripping column according to claim 10, wherein said clearance between the tray and the lower end of the baffle plate is in the range of 2 to 10 mm.

15. A stripping column according to claim 10, wherein the portion of the tray just below the downcomer of the next upper tray forms a deck plate inclined with respect to the tray thereby to prevent stagnation of the slurry on said portion.

16. A stripping column according to claim 10, further comprising a perforated support ring supporting the tray thereon.

17. A stripping column according to claim 10, wherein the plurality of tray segments are each made of expanded metal.

* * * * *